US008279281B1

(12) United States Patent
Doyle

(10) Patent No.: US 8,279,281 B1
(45) Date of Patent: Oct. 2, 2012

(54) DISGUISED SURVEILLANCE APPARATUS

(76) Inventor: Louis W. Doyle, Las Vegas, NV (US)

( * ) Notice: Subject to any disclaimer, the term of this patent is extended or adjusted under 35 U.S.C. 154(b) by 441 days.

(21) Appl. No.: 12/580,980

(22) Filed: Oct. 16, 2009

(51) Int. Cl.
*H04N 9/47* (2006.01)

(52) U.S. Cl. ..................................... 348/151; 348/14.01

(58) Field of Classification Search .................. 348/143, 348/144, 151, 152, 154, 155
See application file for complete search history.

(56) References Cited

U.S. PATENT DOCUMENTS

| | | | | |
|---|---|---|---|---|
| D252,936 | S | 9/1979 | Tibbitts, Jr. | |
| 6,048,209 | A * | 4/2000 | Bailey | 434/267 |
| D426,250 | S | 6/2000 | Lefkowitz | |
| 8,415 | A1 | 7/2001 | Park | |
| 24,203 | A1 | 2/2005 | Wolfe | |
| 6,865,843 | B1 * | 3/2005 | Jordan, Sr. | 43/61 |
| 221,183 | A1 | 10/2006 | Sham | |
| 7,319,378 | B1 | 1/2008 | Thompson et al. | |
| 7,339,608 | B2 | 3/2008 | Ryley et al. | |
| 7,435,153 | B1 * | 10/2008 | Sodec, Jr. | 446/295 |
| 2004/0061614 | A1 * | 4/2004 | Sulaver | 340/573.1 |
| 2004/0227815 | A1 * | 11/2004 | Chen | 348/151 |
| 2010/0321463 | A1 * | 12/2010 | Weinstein et al. | 348/14.01 |

* cited by examiner

*Primary Examiner* — Barbara Burgess

(57) ABSTRACT

The disguised surveillance apparatus provides a stuffed animal toy enclosing surveillance components. The toy can be placed anywhere an operator desires increased inconspicuous security. The plurality of solar cells is disposed upwardly within the toy so that the battery pack within the toy is charged by both solar energy and optionally via an electrical plug within the toy. The motion sensor is disposed within the first eye and the camera within the second eye. The housing is disposed within the toy body and contains the microphone, the cell phone, the CPU, and the speaker. Motion detected triggers the camera to record and the cell phone to dial emergency numbers.

1 Claim, 3 Drawing Sheets

DISGUISED SURVEILLANCE APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Surveillance devices are well known in the art. One problem with such devices is that even an amateur can usually spot them, whether by noting motion sensors or cameras or even door and window contacts. What has been needed is a surveillance system that is not easily noted by an intruder or criminal. The present apparatus provides this and other advantages.

FIELD OF THE INVENTION

The disguised surveillance apparatus relates to security devices and more especially to a disguised surveillance apparatus that also includes cellular phone, solar power and recorded messages.

SUMMARY OF THE INVENTION

The general purpose of the disguised surveillance apparatus, described subsequently in greater detail, is to provide a disguised surveillance apparatus which has many novel features that result in an improved disguised surveillance apparatus which is not anticipated, rendered obvious, suggested, or even implied by prior art, either alone or in combination thereof.

To attain this, the disguised surveillance apparatus is disguised as a toy. The apparatus is not confined to any specific usage. The apparatus can be placed outside of a doorway, outside or inside of a house or business, in a car, or any other imagined useful location. As the apparatus is inconspicuous, intruders and criminals are less likely to note that any surveillance is present. The apparatus provides cellular communication with outside entities through the cell phone disposed within the housing that is fitted within the stuffed animal toy. The CPU is programmed with emergency contact telephone numbers such that motion detected by the motion detector calls the number or numbers. The motion detector is in communication with the camera such that the camera records when motion is detected. The CPU stores recorded video from the camera. A plug for electrical power is provided so that the battery pack is charged via both an electrical outlet and the solar cells. The apparatus can also provide audio warnings to intruders. The CPU is in communication with the speaker. If the motion detector detects a presence, the apparatus can be set to issue warnings from the speaker, such as "The police have been called," or "Leave now," or "Get out," or other appropriate recordings.

Thus has been broadly outlined the more important features of the improved disguised surveillance apparatus so that the detailed description thereof that follows may be better understood and in order that the present contribution to the art may be better appreciated.

An object of the disguised surveillance apparatus is to provide surveillance security disguised as a toy.

Another object of the disguised surveillance apparatus is to provide cellular communication with outside entities.

An added object of the disguised surveillance apparatus is to provide for plug in electrical power.

And, an object of the disguised surveillance apparatus is to provide solar power.

A further object of the disguised surveillance apparatus is to detect motion.

An object of the disguised surveillance apparatus is to provide video recordings.

Yet another object of the disguised surveillance apparatus is to provide audio warnings to intruders.

These together with additional objects, features and advantages of the improved disguised surveillance apparatus will be readily apparent to those of ordinary skill in the art upon reading the following detailed description of presently preferred, but nonetheless illustrative, embodiments of the improved disguised surveillance apparatus when taken in conjunction with the accompanying drawings.

In this respect, before explaining the current embodiments of the improved disguised surveillance apparatus in detail, it is to be understood that the disguised surveillance apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved disguised surveillance apparatus. It is therefore important that the claims be regarded as including such equivalent constructions insofar as they do not depart from the spirit and scope of the disguised surveillance apparatus. It is also to be understood that the phraseology and terminology employed herein are for purposes of description and should not be regarded as limiting.

DETAILED DESCRIPTION OF THE DRAWINGS

Figure 1:
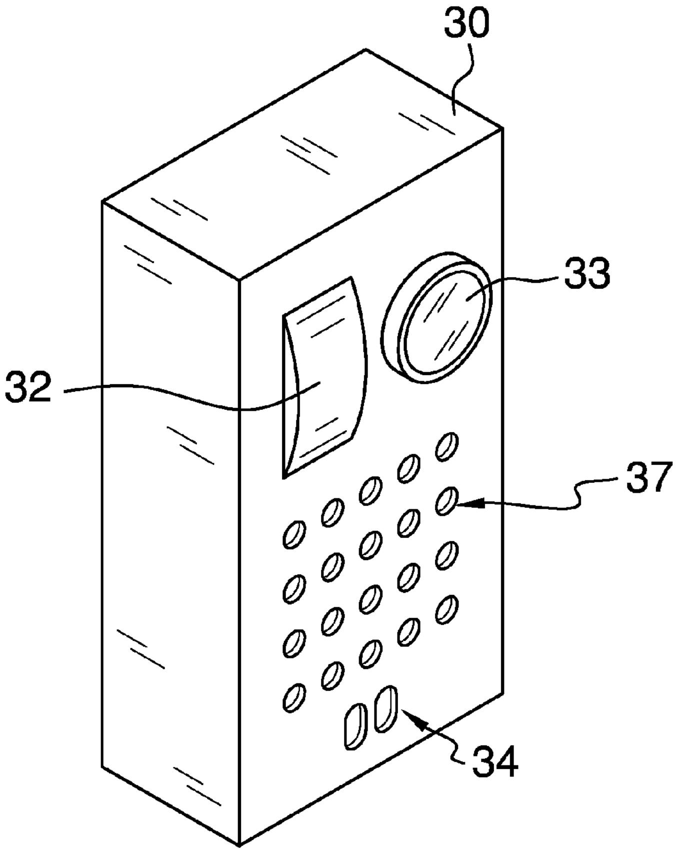
FIG. 1 is a front perspective view of the housing.

With reference now to the drawings, and in particular FIGS. 1 through 5 thereof, the principles and concepts of the disguised surveillance apparatus generally designated by the reference number 10 will be described.

Referring to FIGS. 1 through 4, the apparatus 10 partially comprises the stuffed animal toy 20 having a front 23 spaced apart from the back 24. The head 26 is connected to the body 27. The face 22 is disposed on the head 26 with the first eye 28 spaced apart from the second eye 29. Each eye is disposed within the face 22. The plurality of solar cells 39 is disposed upwardly within the toy 20, in this embodiment within the head 26. The motion sensor 32 is disposed within the first eye 28. The camera 33 is disposed within the second eye 29.

Figure 2:
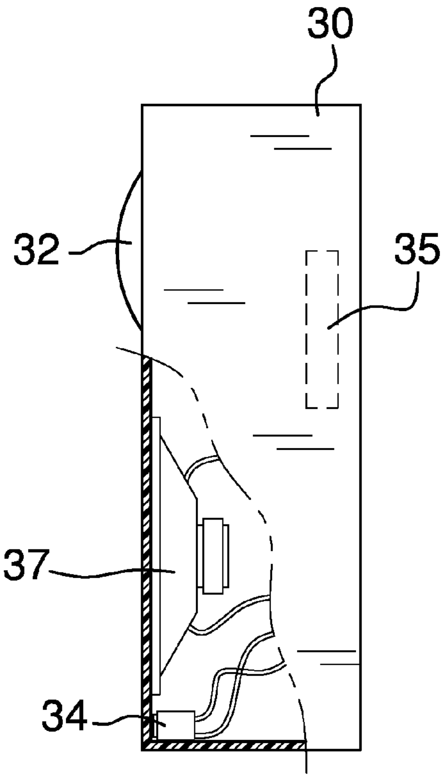
FIG. 2 is a lateral partial cross sectional view of the housing.
Figure 3:
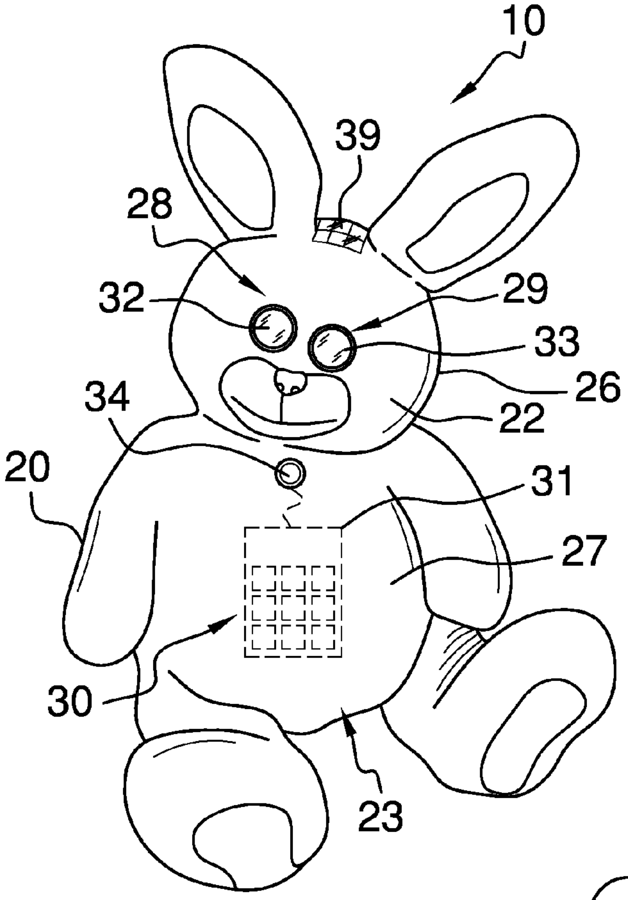
FIG. 3 is a front perspective view of the stuffed animal toy.
Figure 4:
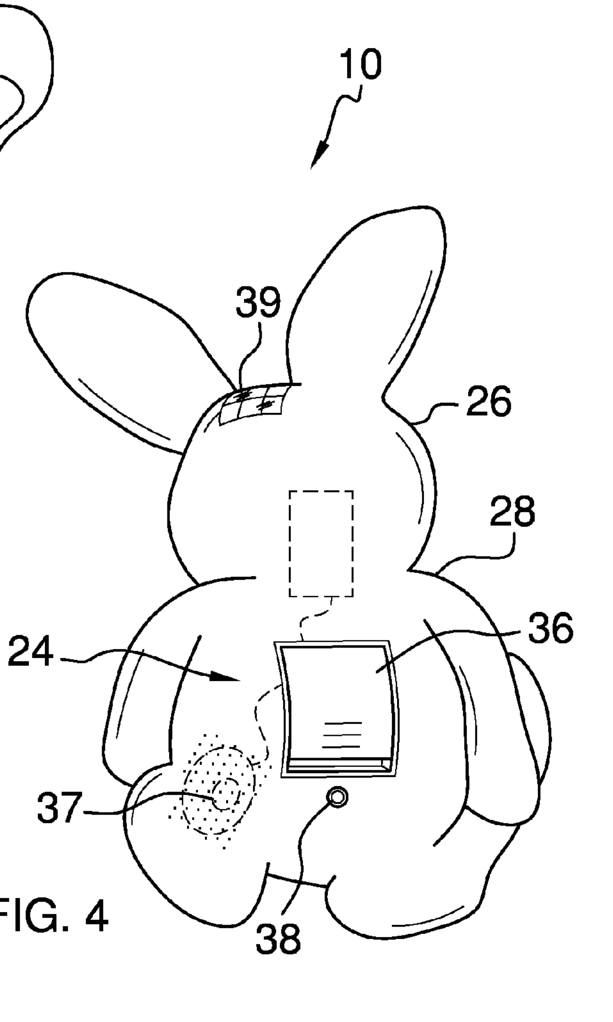
FIG. 4 is a back perspective view of the stuffed animal toy.
Figure 5:
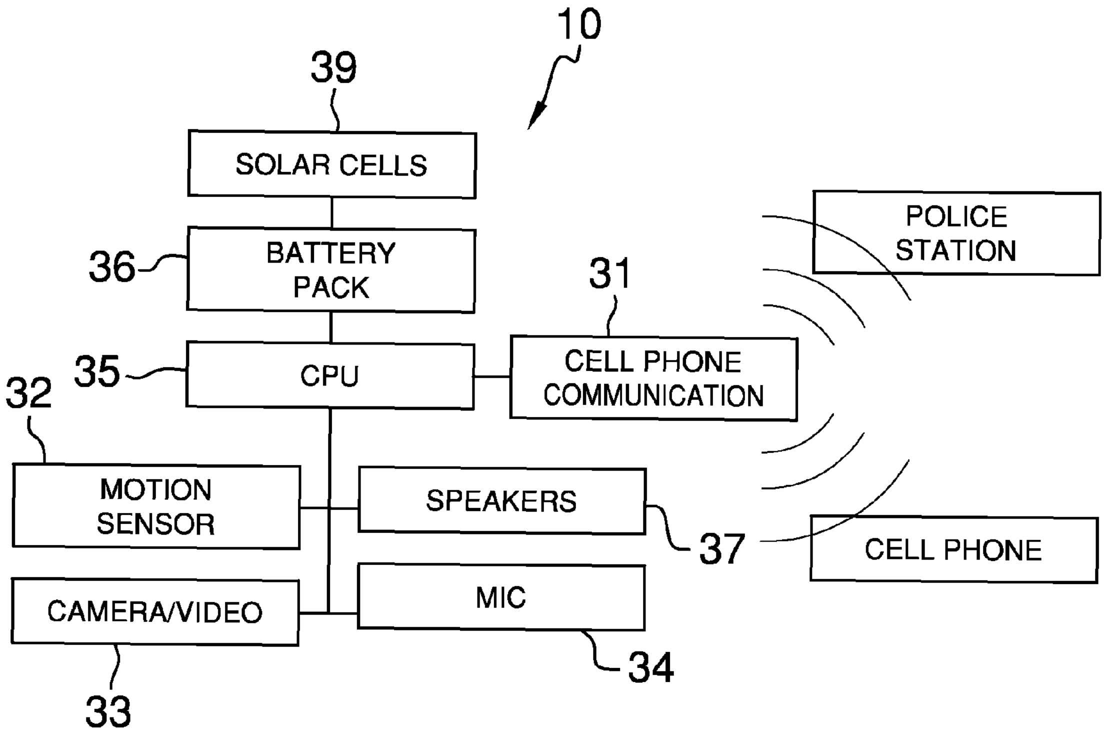
FIG. 5 is a schematic block diagram of the electronics and potential external communication entities.

Referring to FIGS. 3, 4, and 5 and continuing to refer to FIGS. 1 and 2, the housing 30 is disposed within the body 27. The microphone 34 is disposed within the housing 30. The cell phone 31 is disposed within the housing 30. The speaker 37 is disposed within the housing 30. The battery pack 36 is disposed within the body 27. The CPU 35 is disposed within the housing 30.

The CPU 35 is in communication the battery pack 36, the motion sensor 32, the camera 33, the microphone 34, the cell phone 31, and the speaker 37. The plug 38 is disposed within the body 27. The plug 38 is in communication with the battery pack 36.

With respect to the above description then, it is to be realized that the optimum dimensional relationships for the parts of the disguised surveillance apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the disguised surveillance apparatus.

Directional terms such as “front”, “back”, “in”, “out”, “downward”, “upper”, “lower”, and the like may have been used in the description. These terms are applicable to the embodiments shown and described in conjunction with the drawings. These terms are merely used for the purpose of description in connection with the drawings and do not necessarily apply to the position in which the disguised surveillance apparatus may be used.

Therefore, the foregoing is considered as illustrative only of the principles of the disguised surveillance apparatus. Further, since numerous modifications and changes will readily occur to those skilled in the art, it is not desired to limit the disguised surveillance apparatus to the exact construction and operation shown and described, and accordingly, all suitable modifications and equivalents may be resorted to, falling within the scope of the disguised surveillance apparatus.

What is claimed is:

1. A disguised surveillance apparatus comprising, in combination:

a stuffed animal toy having a front spaced apart from a back, a head connected to a body, and a face disposed on the head, a first eye spaced apart from a second eye, each eye disposed within the face;

a plurality of solar cells disposed upwardly within the toy;

a motion sensor disposed within the first eye;

a camera disposed within the second eye;

a housing disposed within the body;

a microphone disposed within the housing;

a cell phone disposed within the housing;

a speaker disposed within the housing;

a battery pack disposed within the body;

a CPU disposed within the housing, the CPU in communication with the battery pack, the motion sensor, the camera, the microphone, the cell phone, and the speaker;

a plug disposed within the body, the plug in communication with the battery pack.

* * * * *